US006890133B2

(12) United States Patent
Singh et al.

(10) Patent No.: US 6,890,133 B2
(45) Date of Patent: May 10, 2005

(54) STEPPED DRILL BIT HAVING SPLIT TIP

(75) Inventors: Iqbal Singh, Charlotte, NC (US); Harley Schuerman, Wilber, NE (US)

(73) Assignee: Irwin Industrial Tool Company, Huntersville, NC (US)

( * ) Notice: Subject to any disclaimer, the term of this patent is extended or adjusted under 35 U.S.C. 154(b) by 125 days.

(21) Appl. No.: 10/274,448

(22) Filed: Oct. 18, 2002

(65) Prior Publication Data

US 2004/0076483 A1 Apr. 22, 2004

(51) Int. Cl.[7] .............................................. B23B 51/02
(52) U.S. Cl. ..................................... 408/225; 408/224
(58) Field of Search ............................. 408/1 R, 223, 408/224, 225, 227, 229, 230

(56) References Cited

U.S. PATENT DOCUMENTS

| 469,057 | A | 2/1892 | Chesnut | |
|---|---|---|---|---|
| 550,190 | A | 11/1895 | Myers | |
| 2,276,532 | A | 3/1942 | Welty | |
| 2,786,373 | A | 3/1957 | Patton | |
| 2,984,130 | A | 5/1961 | Lentz | |
| 3,076,356 | A | 2/1963 | Simich | |
| 3,758,222 | A | * 9/1973 | Oakes | ......................... 408/224 |
| 4,127,355 | A | 11/1978 | Oakes | |
| 4,582,458 | A | * 4/1986 | Korb et al. | .................. 408/224 |
| 5,466,100 | A | * 11/1995 | Ahluwalia | ................... 408/224 |
| 5,816,812 | A | 10/1998 | Kownacki et al. | |
| 5,934,845 | A | 8/1999 | Frey | |

FOREIGN PATENT DOCUMENTS

| DE | 19526686 | * 3/1996 | ........... B23B/51/02 |
|---|---|---|---|
| DE | 29703475 | * 7/1997 | ........... B23B/51/00 |
| DE | 20015550 U | 11/2000 | |
| GB | 995 043 A | 6/1965 | |
| JP | 11-239907 | * 9/1999 | ........... B23B/51/00 |

* cited by examiner

Primary Examiner—Daniel W. Howell
(74) Attorney, Agent, or Firm—Dennis J. Williamson; Moore & Van Allen, PLLC

(57) ABSTRACT

A drill bit is disclosed having a cutting portion having a plurality of axially aligned, graduated cutting members. Each of the members has cutting edges defined by a single slot extending therethrough. A tip portion at one end of the cutting portion defines at least a pair of cutouts therein, wherein one of the cutouts is aligned with the slot.

28 Claims, 4 Drawing Sheets

STEPPED DRILL BIT HAVING SPLIT TIP

FIELD OF THE INVENTION

The present invention relates to drilling and boring tools. In particular, the present invention relates to drill bits for drilling holes of varying sizes into workpieces.

BACKGROUND OF THE INVENTION

Conventional drill bits have been used in the past to bore holes into a workpiece. Typically, such bits position a cutting surface around an axis of the bit, and the bit is rotated at high speed around the axis using a rotary power tool such as a hand drill or a drill press. The rotating cutting edge of the bit bores a circular opening as the bit is advanced into the workpiece.

Standard drill bits may be configured to be of a generally uniform radial size so that a single bit is adapted to produce a hole of a single radius. To promote space savings and to reduce the need to own a large number of standard drill bits, stepped drill configurations have been developed wherein a generally conically shaped bit includes a plurality of graduated, stepped shoulders. The shoulders are of progressively smaller diameters as they are arranged concentrically on the bit axis toward the tip of the bit. The shoulders typically include one or more cutting edges which are defined by a longitudinally extending slot in the side of the bit. The stepped drill bit conveniently may be used to bore openings of varying sizes without the need to change the bit in the power tool.

In the past, these stepped drill bits had shortcomings in their durability and stability. For example, in order to increase the number of cutting edges on each shoulder, one or more additional slots were formed in the side of the bit. The additional slot or slots may decrease the structural integrity of the bit, however, since the amount of material stabilizing the bit structure is decreased. Furthermore, because multiple slots cause the walls of each shoulder to be of decreased arc length, there is less surface to guide each shoulder as it bores its respective hole in the workpiece. This leads to instability and vibration of the bit during its rotation and may compromise the uniformity of the openings that are formed in the workpiece.

BRIEF SUMMARY OF THE INVENTION

In accordance with the present invention, a stepped drill bit of a generally elongated configuration is disclosed that incorporates an improved tip portion and reinforced structure to improve the cutting action of the drill bit while maintaining the convenience of a stable structure. The embodiments disclosed herein can be used to effectively bore holes of varying sizes in workpieces without having to change bits to accommodate such varying sized holes. The improved tip portion maintains the stability of the bit structure while significantly facilitating the initial boring operation into the workpiece. This is a significant improvement over previous designs. A method of using a drill bit in accordance with the present invention in conjunction with steps for boring a hole in a workpiece is also disclosed.

In one aspect of the present invention, a drill bit embodiment is disclosed having a cutting portion including a plurality of axially aligned, graduated cutting members. Each of the members has cutting edges defined by a single slot extending through a plurality of the members. A tip portion at one end of the cutting portion has at least two V-shaped cutouts therein, wherein one of the V-shaped cutouts is aligned with the slot.

In another aspect of the present invention, a pair of flutes is defined on the tip portion. The flutes define at least a pair of cutouts, one of which is aligned generally with the slot.

In another aspect of the present invention, a drill bit embodiment is disclosed having an elongated shaft extending along an axis. A bit holding portion is defined on the shaft. A drilling portion is located adjacent the shaft that includes a generally conical tip portion opposite the bit holding portion and a plurality of generally conical stepped shoulders concentrically aligned along the axis. Each of the shoulders includes an outer diameter that is larger than the next adjacent ledge toward the tip portion. A first V-shaped slot is defined in the tip portion and the drilling portion, with the slot extending generally axially toward the bit holding portion, and a second V-shaped slot is defined in the tip portion apart from the first V-shaped slot.

In yet another aspect of the present invention, a drill bit embodiment is disclosed having an elongated drilling portion and a plurality of adjacent cylinders of increasing diameter extending from a tip portion and a first V-shaped slot defined in the tip portion. The slot extends generally axially through the plurality of cylinders, and a second V-shaped slot is defined in the tip portion apart from the first V-shaped slot.

In yet another aspect of the present invention, a drill bit embodiment is disclosed having an elongated shaft having a drilling portion and a mounting portion. The drilling portion includes a graduated set of annular cutting members extending concentrically along an axis from a tip portion toward the mounting portion, and each of the cutting members has a sector cutout aligned together along the axis. The tip portion defines a first sector tip cutout extending axially therethrough and aligning with the sector cutouts of the cutting members, and a second sector tip cutout extending therethrough that does not align with the sector cutouts of the cutting members.

The present invention may also be embodied in a method of forming a sized opening in a workpiece. The method includes the steps of providing a drill bit having a graduated, generally conical cutting portion having generally conical cutting members of increasing diameter extending from a tip portion. The bit also includes a first V-shaped slot defined in the tip portion and extending generally axially through a plurality of the cylinders, and a second V-shaped slot defined in the tip portion apart from the first V-shaped slot. The method includes the steps of drilling a first opening having a first diameter using the drill bit, and drilling a second opening having a second diameter larger than the first diameter.

DETAILED DESCRIPTION OF THE INVENTION

Figure 1:
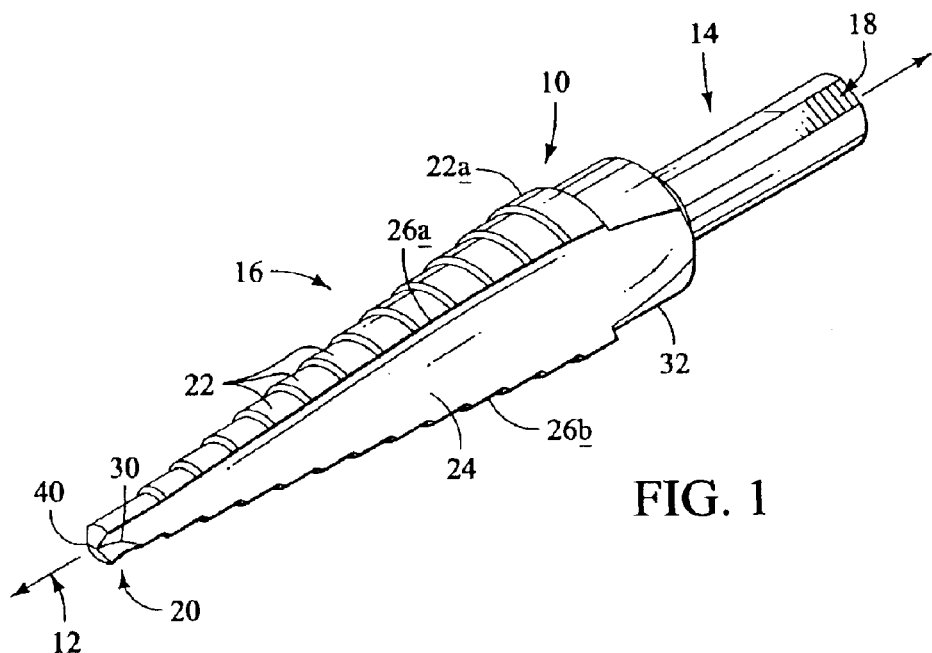
FIG. 1 is a perspective view of a preferred embodiment of a drill bit in accordance with the present invention.

Referring now to the accompanying drawings, FIG. 1 illustrates the main conical-shaped body of a preferred embodiment of a drill bit in accordance with the present invention. In particular, the drill bit 10 is defined along a longitudinally extending axis shown in FIG. 1 at reference numeral 12. The drill bit 10 further includes a bit holding portion including an elongated cylindrical shaft 14 extending along the axis 12 and a generally conical-shaped drilling portion 16 axially aligned and adjacent to the bit holding portion 14. The bit holding portion 14 preferably defines at least one longitudinal flat surface 18 and is sized to fit within an ordinary mandrel, chuck or stock, such as ordinarily employed for holding rotating tool bits. The remainder of the shaft may be generally conical.

The main conical body of the drilling portion 16 is reduced or tapered toward a tip portion 20, which is at an end opposite the bit holding portion 14. This conical body of the drilling portion 16 is provided with a concentric series of graduated shoulders 22. Preferably, the shoulders 22 regularly decrease in diameter from the general area of the bit holding portion 14 toward the smaller end of the drilling portion 16 proximate the tip portion 20.

Figure 5:
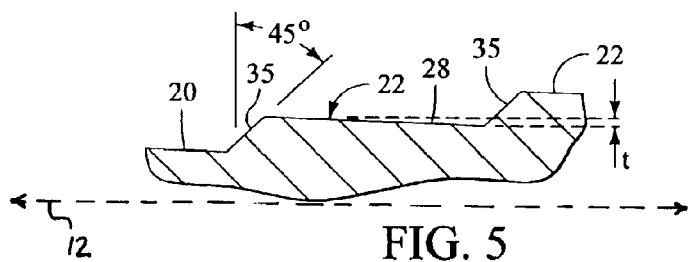
FIG. 5 is a side cutaway view taken along line 7—7 of FIG. 6.

Preferably, each shoulder 22 includes a wall 28 that extends generally concentrically with the axis 12. In the preferred embodiment, each successive wall 28 defines a back taper as will be described further below. In the preferred embodiment, the transitions between adjacent shoulders are formed with separate, beveled, frustoconical sections 35. Each section 35 defines a cutting edge 35b and a heel edge 35a. Preferably, the frusto-conical section 35 defines an angle of 450° with the axis 12, as shown in FIG. 5.

The drilling portion 16 includes a generally right-cylindrical base portion 32 that extends between the shoulder 22a, having a widest diameter, and the bit holding portion 14. The base may be of any axial length, and is convenient for holding the drill bit 10 when mounting it to a chuck.

The shoulders 22 are interrupted by an elongated slot or flute 24 that is longitudinally and generally axially disposed down one side of the drilling portion 16. The elongated slot 24 forms a continuous channel for the elimination of chip swarf that is produced from the workpiece during the drilling operation, and may be viewed as a series of aligned sector cutouts for each shoulder 22. Where the shoulders 22 intersect the elongated slot 24, separate and distinct edges 26a and 26b are formed at the slot edges of the shoulders 22. In particular, a heel edge 26a and an opposing edge 26b are formed. Along the edges of the slots, such edges 26a and 26b are formed in different circular planes, in order to provide a way for regularly increasing the size of the hole being bored into the workpiece.

Figure 4:
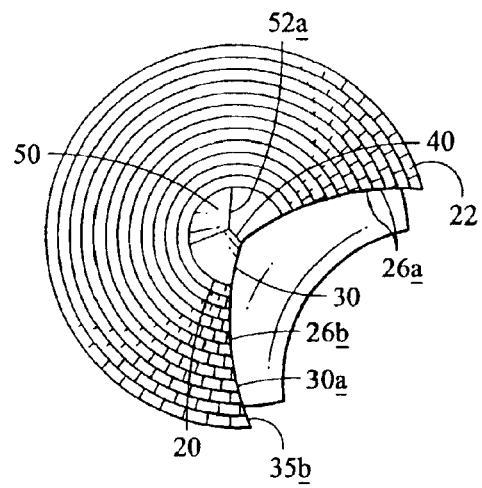
FIG. 4 is a front view of the preferred embodiment of FIG. 1.

As shown in FIG. 4, the rake angles of the heel edge 26a and the edge 26b for each progressive shoulder 22 may vary from 40 degrees at the first shoulder 22 closest to the tip portion 20, to 0 degrees at the last shoulder 22 closest to the bit holding portion 14. As shown in FIG. 1 and FIG. 4, the interior surfaces of the slot 24 may bow outwardly from the innermost radial position near the tip portion 20 near the longitudinal center of the slot. The slot 24 is preferably wide enough to facilitate chip removal from the workpiece while being sufficiently narrow to preserve the structural integrity of the drilling portion. Preferably, however, the single slot 24 interrupts the periphery of each shoulder 22 by an angle of approximately 90 degrees so that each such shoulder has 270 degrees of uninterrupted periphery to maintain accurately concentric bearing of all portions of the bit in the work as formation of the hole proceeds.

As shown in FIG. 5, the wall 28 of each shoulder 22 may be provided with a back taper to relieve the workpiece opening from excessive friction from the edge 26a and any adjoining portions of the wall 28 as the drill progresses into the workpiece. In the present embodiment, as shown in FIG. 5, the taper is appropriately angled so that the taper distance t is approximately 0.002 to 0.010 inches as shown.

It will further be noted that the beveled, frustoconical leading end 35 of each shoulder 22 is provided with axial relief so that such beveled leading end extends helically. In the present instance, this axial relief is approximately 0.005 to 0.015 inches and may be seen in FIG. 2. In a drill bit of the present type which is employed in large part for drilling sheet metal and is usually hand-held and hand-fed, this sharply limited axial relief serves to control the feed rate of the bit for clean drilling and also serves to prevent the drill bit from tearing into the work, as often occurs in drilling relatively thin metal sheets.

It should also be noted that, in addition to the back taper described above, each shoulder 22 is also provided with radial relief, wherein the leading edge at the edge 26b is allowed to radially protrude slightly more than the radial extent of heel edge 26a on each shoulder 22. This may be accomplished through reducing the radial projection of the heel edge 26a, increasing the radial distance of the edge 26b, or both. In the present embodiment, it is preferred that the shoulder 22 is allowed to have a slightly eccentric shape to provide radial relief. Preferably, the radial difference between the edge 26b and the heel edge 26a on each shoulder varies from 0.005 inches to 0.013 inches starting at 50° to 80° from the edge 26b.

Figure 6:
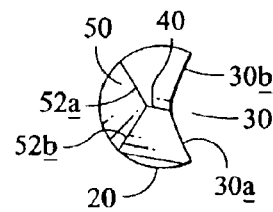
FIG. 6 is an enlarged view of the tip portion of FIG. 4, with other details of the bit omitted.
Figure 7:
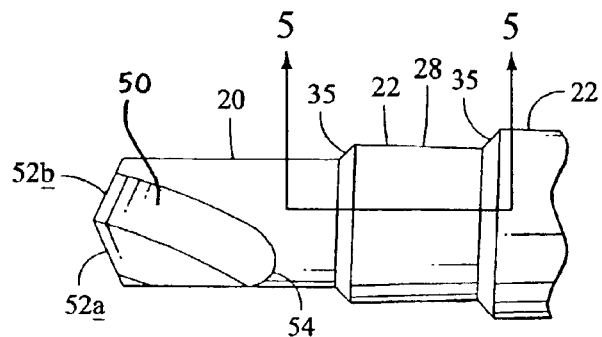
FIG. 7 is a partial side view of the tip portion of the preferred embodiment of FIG. 1.

FIG. 6 and FIG. 7 illustrate enlarged views of the tip portion 20 so that various cross-sectional angles may be seen. Preferably, the elongated slot 24 has a cross section that initiates near the tip portion 20 as a sector cutout or V-shaped slot 30 on one side of the tip portion 20. The slot 30 sweeps a cross-sectional sector of 120–145 degrees within a plane perpendicular to the axis 12 at the tip portion 20. Preferably, the sector tip cutout or V-shaped slot 30 extends into and is aligned with the slot 24. As the slot 24 extends toward the bit holding portion 14, the slot transitions to a more arcuate, filleted curvature between the respective heel edge 26a and the edge 26b, as shown in FIG. 4. The slot 30 includes two edges 30b and 30a as shown, which define the outer extents of the slot 30. Preferably, the angle subtended by the slot 30 does not exceed 145 degrees in the preferred embodiment. One skilled in the art will recognize that other angles may be utilized in alternative embodiments.

Figure 2:
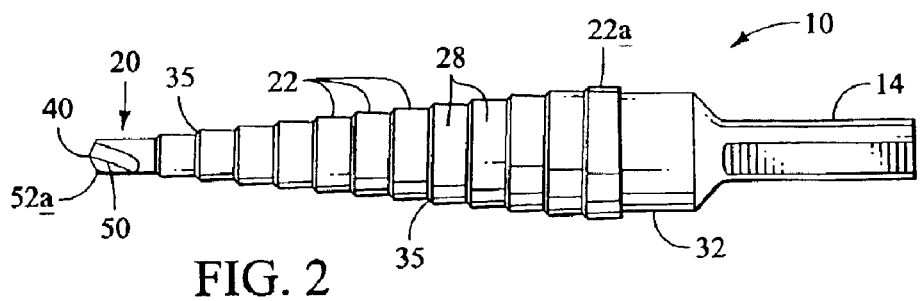
FIG. 2 is a side view of the preferred embodiment of FIG. 1.
Figure 3:
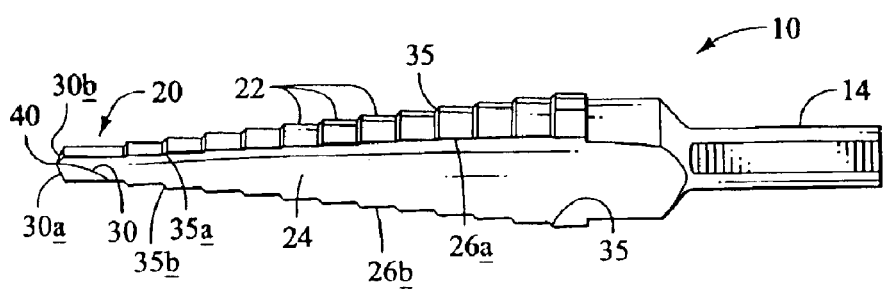
FIG. 3 is a side view, similar to that of FIG. 2, showing the preferred embodiment at an axially rotated position.

As shown in FIG. 2, the tip portion 20 preferably forms a sharp point or generally conical portion 40 at its distal end. The point 40 is used for centering the bit 10 to drill a pilot hole for progressive enlargement by the shoulders 22 of the bit. The most significant improvement in the cutting operation of the stepped bit 10 of the present embodiment may be made by increasing the number of cutting edges on the tip portion 20. Thus, the tip portion 20 has been modified in accordance with the present invention to have a split configuration with multiple cutting edges. With the tip configured in such a manner, the remainder of the drilling portion 16 need include only the single elongated slot 24 to define the heel edge 26a and the edge 26b.

Turning to FIG. 6, the tip portion 20 and its generally conical portion 40 define a second slot 50 preferably located apart from and radially opposite the first slot 30. Like the cross-section of the opposing slot 30, the slot 50 has a sector tip cutout portion in the shape of a V at the axis 12, sweeping a sector of 120–145 degrees from a cross-section perpendicular to axis 12 at the tip portion 20. The second slot 50 is shown to interrupt the generally conical portions 40 of the tip portion 20 in FIGS. 5 and 6. The slot 50 preferably extends only within the tip portion 20, and defines cutting edge 52a and heel edge 52b. The cutting edge 52a and heel edge 52b are separated by an angle of 120–145 degrees. Preferably, the separation is no more than 145 degrees. One skilled in the art will of course recognize that a number of alternative angles may be utilized in alternative embodiments.

As shown in the side view of FIG. 7, the slot 50 ends at a distal slot portion 54, and extends at an angle to the axis 12 of the bit 10. In the preferred embodiment, the slot 50 extends along the cylindrical wall of the tip portion 20 in a helical fashion. The slot 50 is thus not aligned with the longitudinally extending slot 24, contrary to the slot 30 which is so aligned.

The tip portion 20 therefore includes two cutting edges 52a and 30a in addition to two heel edges 52b and 30b which may be used to initiate boring into the workpiece. In use, the tip portion 20 of the drilling portion 16 is introduced to the workpiece (not shown) with the center of the generally conical portion 40 of the tip portion 20 positioned at the center of the desired hole position. As the bit is rotated counterclockwise in the view shown in FIG. 4 by a power tool (not shown), the cutting edges 30a and 52a engage the workpiece and bore a pilot hole therein. Chip swarf is lifted out from the pilot hole via the elongated slot 24 and slot 50. To enlarge the hole, the user advances the drilling portion 16 toward the desired stepped shoulder 22. As each shoulder 22 is inserted into the bore, the beveled, frusto-conical section 35 and its single cutting edge 35b are used to enlarge the bore. The frusto-conical sections 35 lead to the edges 26a and walls 28, which lead to the edges 26a and walls 28, which are provided with back taper to facilitate transition to the larger shoulders.

Figure 8:
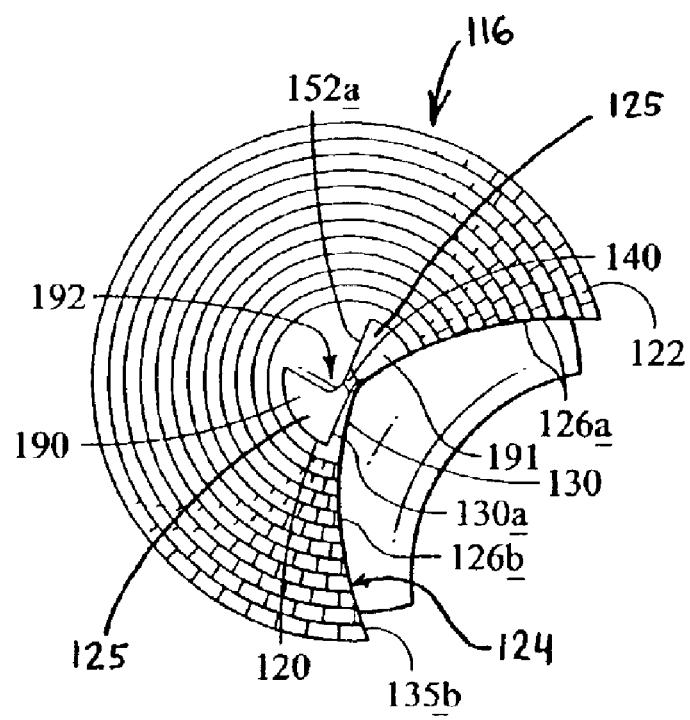
FIG. 8 is a front view of an alternative embodiment of a drill bit in accordance with the present invention.
Figure 9:
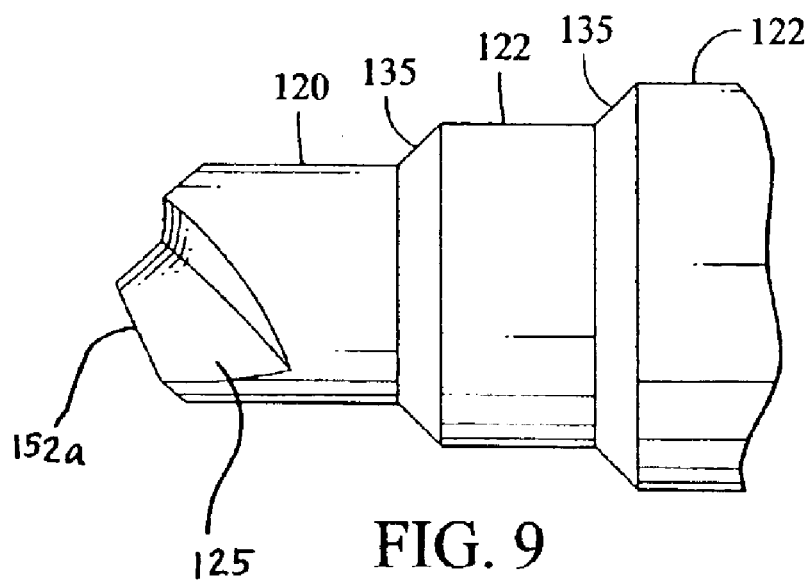
FIG. 9 is a partial side view of the embodiment of FIG. 8.

In an alternative embodiment in accordance with the present invention, a double-cutting-edge, split-point "S"-type tip may be implemented with the stepped drilling portion 16 as described above. This tip configuration generally defines a pair of flutes 125 and is similar to those implemented in traditional, dual-helix wood-boring drill bits. In the present implementation, as shown in FIGS. 8 and 9, wherein like reference numerals preceded by a "1" digit denote similar parts, a two-fluted tip 192 may be provided on the tip portion 120. The flutes 125 of the tip 192 preferably define a pair of leading cutting edges 152a and 130a which are generally straight and may, from the top view of FIG. 8, extend beyond a radius of the tip of the bit. The trailing portions 190 and 191 are preferably tapered and reinforced to provide strength and support to the edges 152a and 130a, respectively. The trailing portions 190 and 191 of the flutes 125 together with the edges 152a and 130a respectively, define V-shaped slots in opposing sides of the tip portion 120. The V-shaped slot defined by the edges 130a and the trailing portion 198 forms a sector cutout that generally aligns with the elongated slot 124 of the stepped drilling portion 116.

Figure 10A:
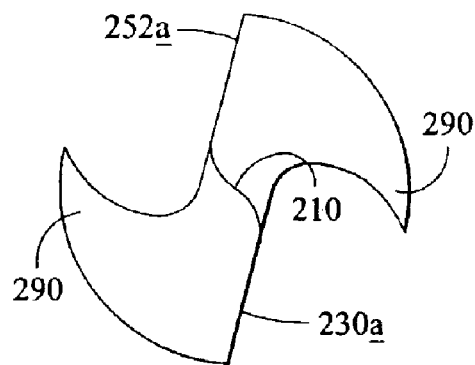
FIGS. 10A–F are front views of alternative embodiments of tip portions in accordance with the present invention.
Figure 10D:
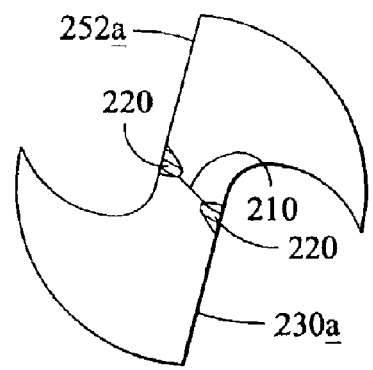
Figure 10B:
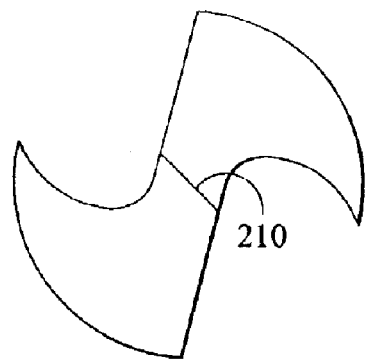
Figure 10E:
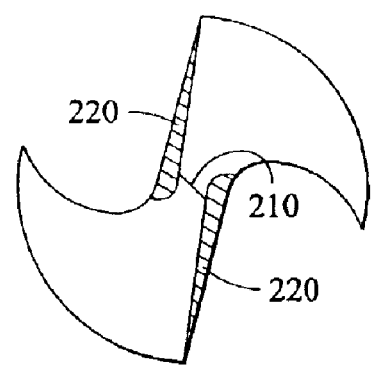
Figure 10C:
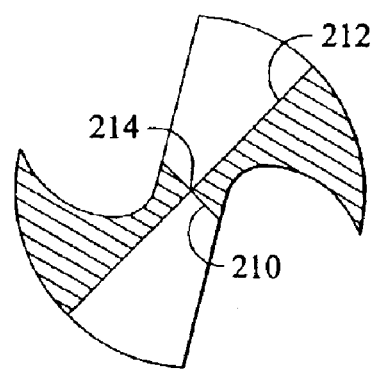

Other embodiments of various split-point tip types that may be implemented in the present invention are shown in FIGS. 10A–E. The tips shown in FIGS. 1A–C are of conventional U.S. geometries with varying tip seams 210 that define the peak of the tip. In the embodiment of FIG. 1A, the tip seam 210 is of a wavy form, in the embodiment of FIG. 10B, the tip seam 210 is of a straight form. In the embodiment of FIG. 10C, the straight tip seam 210 is intersected by an elongate seam 212 to form a pointed peak 214.

Figure 10F:
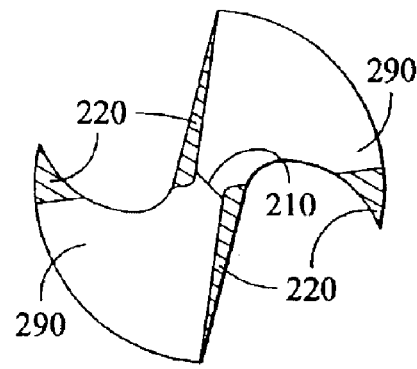

The tips shown in FIGS. 10D–F are implementations based on other geometries having filleted or reduced portions 220 to remove material from the tip to provide a reduced trailing portion 290 or reduced cutting edge 252a and 230a.

It should be noted that there could be a wide range of changes made to the present invention without departing from its scope. For example, the bit may include other longitudinal slots spaced about the circumference of the drilling portion that are not as deep or pronounced as the slot as shown. One of the slots may extend through the tip portion. Furthermore, more than two slots may be formed in the tip portion, thereby including more cutting edges. Thus, it is intended that the foregoing detailed description be regarded as illustrative rather than limiting and that it be understood that it is the following claims, including all equivalents, which are intended to define the scope of the invention.

We claim:

1. A drill bit comprising:
   an elongated shaft extending along an axis, said shaft defining a bit holding portion;
   a drilling portion located adjacent said shaft, said drilling portion including a generally conical tip portion opposite said bit holding portion and a plurality of stepped shoulders concentrically aligned along said axis, each of said stepped shoulders having an outer diameter that is larger than the next adjacent ledge toward said tip portion;
   a first V-shaped slot defined in said tip portion and said drilling portion, said first slot extending generally axially toward said bit holding portion; and
   a second V-shaped slot defined in said tip portion apart from said first slot, wherein said second V-shaped slot does not extend the entire length of said drilling portion.

2. A he drill bit of claim 1 wherein said second V-shaped slot is defined radially opposite said first slot in said tip portion.

3. A method of forming a sized opening in a workpiece, said method comprising the steps of:
   providing a drill bit comprising a generally conical drilling portion defining a plurality of concentric cutting members and a single groove extending along said drilling portion, said drill bit including a tip portion defining a plurality of flutes;
   drilling a first opening using said plurality of flutes of said tip portion; and
   drilling a sized opening larger than said first opening using one of said plurality of cutting members.

4. The drill bit of claim 1 wherein each of said stepped shoulders further comprises an axially extending wall defining a back taper.

5. The drill bit of claim 4 wherein each of said stepped shoulders further comprises a cylindrical section.

6. The drill bit of claim 1 wherein said second V-shaped slot is defined radially opposite said first slot in said tip portion.

7. The drill bit of claim 5 wherein said second V-shaped slot comprises a sector-shaped cross-section extending less than 90 degrees in arc through a cross-section of said tip portion.

8. The drill bit of claim 6 wherein said tip portion defines a conical extension on at least a portion of said tip, said conical extension being aligned axially with said axis.

9. The drill bit of claim 8 wherein said first and said second slots are cut into said conical extension.

10. The drill bit of claim 5 wherein an annular edge of each of said right cylindrical sections includes a frusto-conical portion defining at least one cutting edge.

11. The drill bit of claim 5 further comprising substantially frustroconical sections interposed between successive ones of said right cylindrical sections on said drilling portion.

12. A drill bit comprising:
a cutting portion having a plurality of axially aligned, graduated cutting members, each of said members having cutting edges defined by a single slot extending through said plurality of graduated cutting members; and
a tip portion at one end of said cutting portion having at least two V-shaped cutouts therein, wherein one of said V-shaped cutouts is aligned with said single slot.

13. A method of forming a sized opening in a workpiece, said method comprising the steps of:
providing a drill bit comprising:
a graduated, generally conical cutting portion having cutting members of increasing diameter extending from a tip portion;
a first V-shaped slot defined in said tip portion, said slot extending generally axially through a plurality of said cutting members; and
a second V-shaped slot defined in said tip portion apart from said first slot, wherein said second V-shaped slot does not extend through all of said cutting members;
drilling a first opening having a first diameter using said drill bit; and
drilling a second opening having a second diameter larger than said first diameter using said drill bit.

14. A drill bit comprising:
a stepped drilling portion defining a generally conical shape;
a single elongated slot extending along said stepped drilling portion; and
a tip portion defined on a distal end of said drilling portion and extending therefrom, said tip portion defining a plurality of slots each defining a cutting edge;
wherein one of said plurality of slots is generally aligned with said elongated slot.

15. A drill bit comprising:
an elongated drilling portion having a plurality of adjacent cylinders of increasing diameter extending from a tip portion, first V-shaped slot defined in said tip portion, said slot extending generally through said plurality of adjacent cylinders alone an axis: and
a second V-shaped slot defined in said tip portion, apart from said first slot, wherein said second V-shaped slot does not extend the entire length of said drilling portion.

16. The drill bit of claim 15 wherein said second V-shaped slot is defined radially opposite said first slot in said tip portion.

17. The drill bit of claim 15 wherein each of said plurality of cylinders further comprises includes a frusto-conical portion defining at least one cutting edge.

18. The drill bit of claim 17 wherein said second V-shaped slot extends at an angle to said axis.

19. A drill bit comprising:
an elongated shaft having a drilling portion and a mounting portion;
said drilling portion having a graduated set of annular culling members extending concentrically along an axis from a tip portion toward said mounting portion, each of said culling members having a sector cutout aligned together along said axis; said tip portion defining a first sector tip cutout extending axially therethrough and aligning with said sector cutouts of said cutting members and a second sector tip cutout extending therethrough that does not align with said sector cutouts of said culling members.

20. The drill bit of claim 19 wherein said second sector tip cutout is defined radially opposite said first sector tip cutout in said tip portion.

21. The drill bit of claim 20 wherein said second sector tip cutout comprises a cross-section extending less than 90 degrees in arc through a cross-section of said tip portion.

22. The drill bit of claim 19 wherein said sector cutouts of said cutting members form cutting edges with a frusto-conical portion of said cutting members.

23. The drill bit of claim 19 wherein said second sector tip cutout extends axially through at least a part of said tip portion.

24. The drill bit of claim 23 wherein said second sector tip cutout extends helically through at least a part of said tip portion.

25. A drill bit comprising:
an elongated drilling portion having a first end and a second end, said drilling portion defining a graduated set of stepped annular cutting members extending concentrically along an axis and increasing in radial size from said first end toward said second end;
a single elongated slot extending along said drilling portion between said first end and said second end; and
a tip portion defined on said first end, said tip portion defining a plurality of flutes.

26. The drill bit of claim 25 wherein each of plurality of said flutes further comprises a forward portion and a trailing portion, said forward portion defining a cutting edge.

27. The drill bit of claim 26 wherein said two of said plurality of flutes define a pair of slots on said tip portion, one of said pair of slots being aligned with said elongated slot.

28. The drill bit of claim 27 wherein said two flutes define an S- shape when viewed axially.

* * * * *

UNITED STATES PATENT AND TRADEMARK OFFICE
CERTIFICATE OF CORRECTION

PATENT NO. : 6,890,133 B2
DATED : May 10, 2005
INVENTOR(S) : Iqbal Singh et al.

It is certified that error appears in the above-identified patent and that said Letters Patent is hereby corrected as shown below:

Column 6,
Line 54, replace "A he" with -- The --.

Column 8,
Line 1, replace "first" with -- a first --.
Line 3, replace "alone" with -- along --.
Line 6, replace "portion," with -- portion --.
Lines 20, 22 and 28, replace "culling" with -- cutting --.

Signed and Sealed this

Twelfth Day of July, 2005

JON W. DUDAS
*Director of the United States Patent and Trademark Office*